United States Patent [19]
Asakura et al.

[11] Patent Number: 5,739,496
[45] Date of Patent: Apr. 14, 1998

[54] METHOD OF CONNECTING A WIRE TO A TERMINAL AND AN APPARATUS THEREFOR

[75] Inventors: Nobuyuki Asakura; Tetsurou Ide, both of Shizuoka, Japan

[73] Assignee: Yazaki Corporation, Tokyo, Japan

[21] Appl. No.: 621,884

[22] Filed: Mar. 26, 1996

[30] Foreign Application Priority Data

Mar. 27, 1995 [JP] Japan .................... 7-068052

[51] Int. Cl.$^6$ .......................... B23K 35/02; B23K 11/11
[52] U.S. Cl. .................. 219/56.22; 219/56.1; 219/119
[58] Field of Search ............................ 219/56.1, 56.22, 219/85.18, 119

[56] References Cited

U.S. PATENT DOCUMENTS

| | | | |
|---|---|---|---|
| 2,253,375 | 8/1941 | Henninger | 219/56.2 |
| 3,368,059 | 2/1968 | Scott et al. | 219/56.22 |
| 5,153,404 | 10/1992 | Riordan et al. | 219/56.22 |

FOREIGN PATENT DOCUMENTS

| | | |
|---|---|---|
| 495372 | 3/1992 | Japan . |
| 6-218552 | 8/1994 | Japan . |

Primary Examiner—Teresa J. Walberg
Assistant Examiner—J. Pelham
Attorney, Agent, or Firm—Sughrue, Mion, Zinn, Macpeak & Seas, PLLC

[57] ABSTRACT

A method and apparatus for spot welding a wire to a terminal where the core wires of the wire are not crushed or frayed and where the tensile strength of the connecting portion is improved. In the method of connecting the terminal and wire by spot welding, a concave groove (27a) corresponding to a section of the wire is formed in advance in the top end of a wire-side electrode (27) of spot welding electrodes. An exposed core portion (1a) of the wire is laid on the inner surface of a wire connection portion (13a) of the terminal, a section of which has been worked into a U-shape. While this overlaid portion is held between a terminal-side electrode (25) and the concave groove (27a) of the wire-side electrode (27), a current is supplied thereto under pressure. The apparatus includes the two electrodes including the wire-side electrode having a concave portion in which the wire is received as well as the opposing terminal-side electrode.

4 Claims, 5 Drawing Sheets

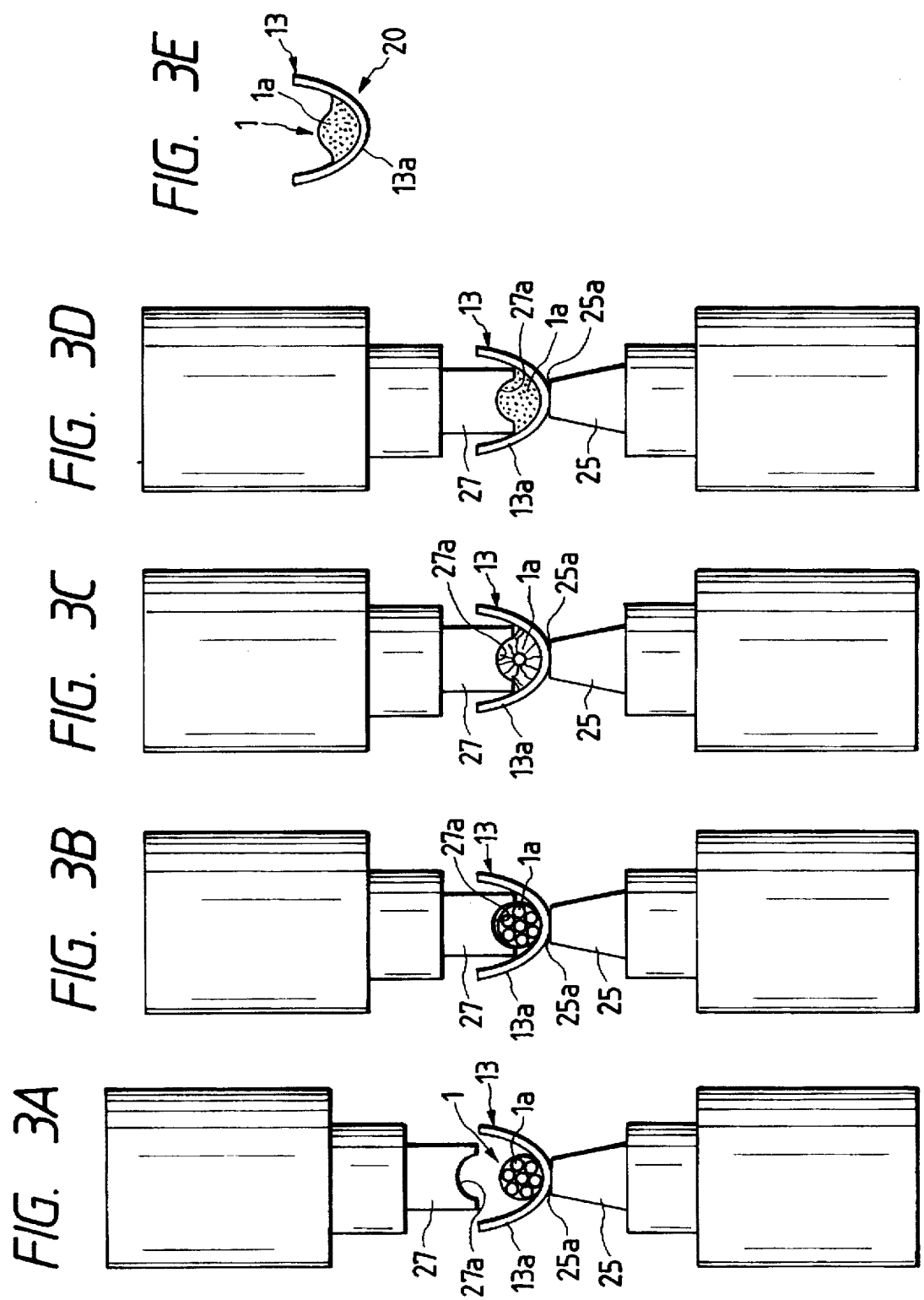

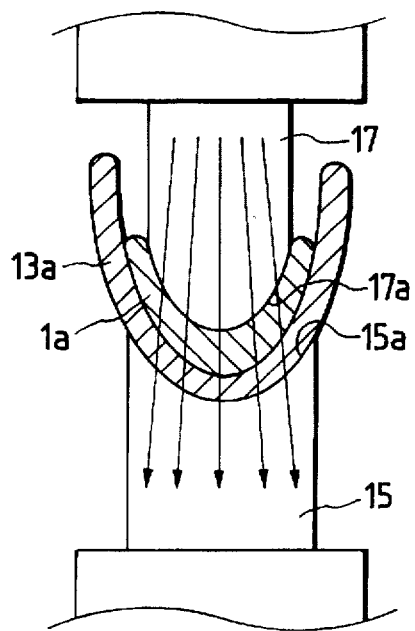
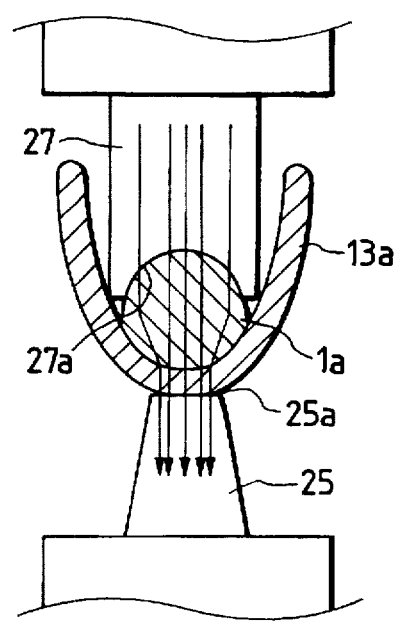
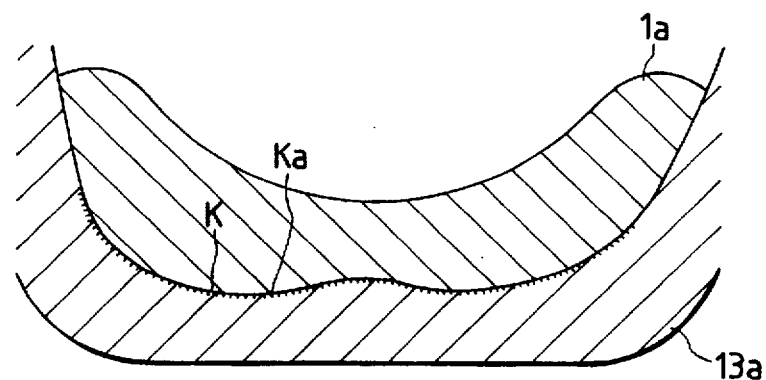
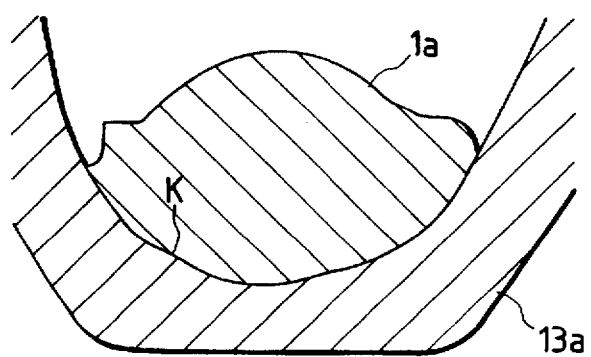

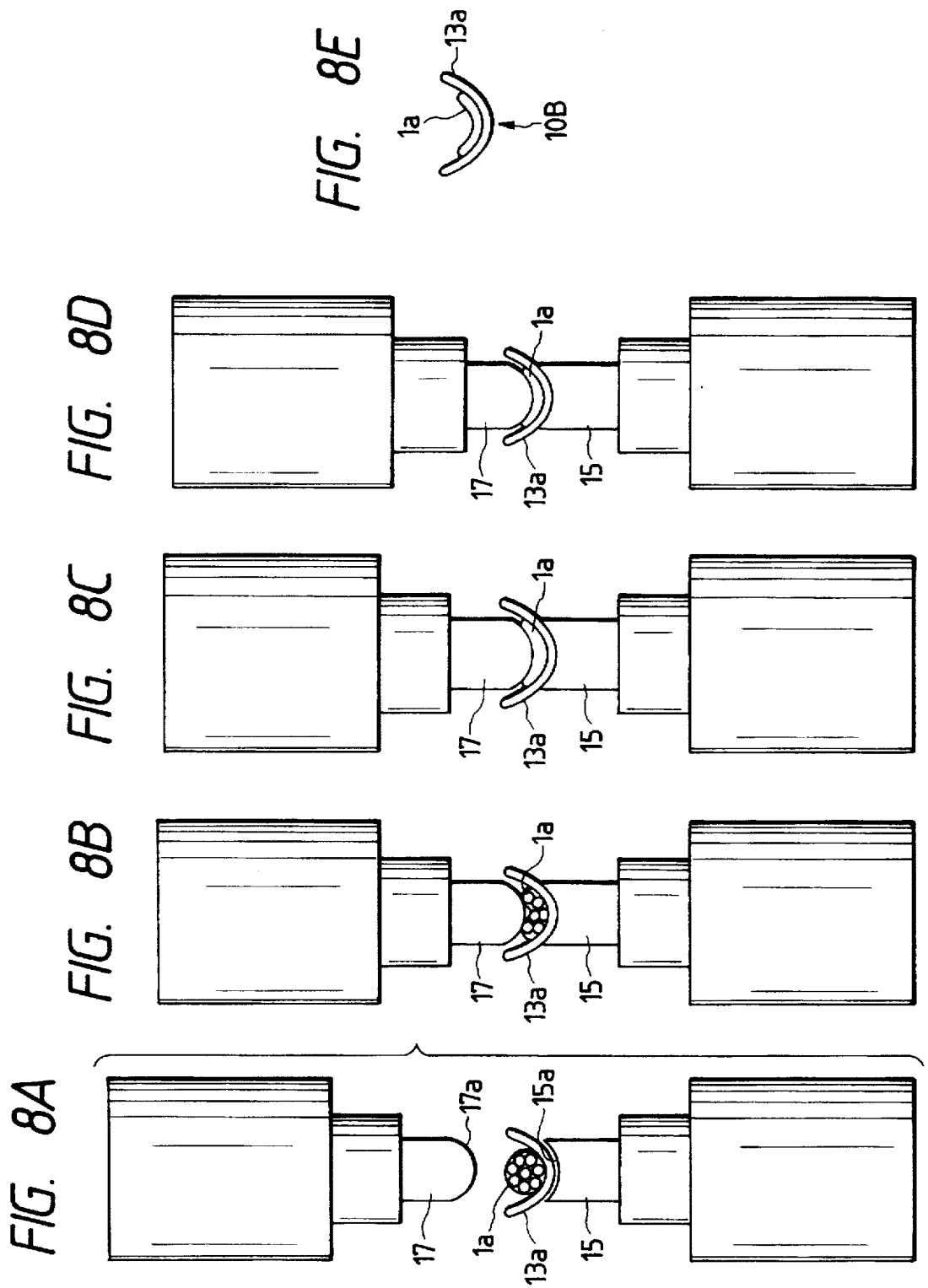

5,739,496

METHOD OF CONNECTING A WIRE TO A TERMINAL AND AN APPARATUS THEREFOR

BACKGROUND OF THE INVENTION

1. Field of the Invention

The present invention relates to a method of connecting a terminal and a wire by spot welding as well as an apparatus including a pair of electrodes for performing the spot welding.

2. Related Art

An example of a conventional spot-welding method will be described with reference to FIGS. 6A and 6B.

In this method, as shown in FIG. 6A, by use of upper and lower electrodes 7 and 5 the top ends of which are flat, a plate-like wire connection portion 3a of a terminal is positioned on the lower electrode 5, and an exposed core portion 1a of a wire is laid on the wire connection portion. The portion where the wire connection portion 3a and the exposed core portion 1a are laid on each other is held between the upper and lower electrodes 7 and 5, and a current is made to flow through that portion under pressure, so that the exposed core portion 1a and the wire connection portion 3a are welded to each other as shown in FIG. 6B. However, in this method, the exposed core portion 3a is crushed by the pressure of the upper and lower electrodes 7 and 5 so as to be greatly deformed compared with its original shape and welded into pieces, so that there is a possibility that the total strength of a connection portion 10 is reduced.

There is therefore provided another conventional connection method that is shown in FIGS. 7A and 7B (see JP-A-6-218552). In this method, a terminal 13 having a wire connection portion 13a curved into a U-shape is used as shown in FIG. 7A. In addition, correspondingly to the U-shaped wire connection portion 13a, a semicircular concave portion 15a and a semicircular convex portion 17a are formed on the top end surfaces of lower and upper electrodes 15 and 17, respectively. The exposed core portion 1a is position in the U-shaped wire connection portion 13a held between the semicircular concave and convex portions 15a and 17a. Thereafter, a current flows between the electrodes under pressure, thereby obtaining a connection portion 10B having a structure where the exposed core portion 1a crushed and deformed is welded with the inner surface of the U-shaped wire connection portion 13a as shown in FIG. 7B.

The procedures of welding in this ladder case is shown in FIGS. 8A to 8E. First, as shown in FIG. 8A, the U-shaped wire connection portion 13a of the terminal is positioned on the concave portion 15a of the lower electrode 15, and the exposed core portion 1a of a wire is laid thereon. In this state, as shown in FIG. 8B, the upper electrode 17 is moved down to contact the exposed core portion 1a, and while a current flows between the electrodes 15 and 17, the upper electrode 17 is further moved down to apply pressure thereto. Consequently, as shown in FIGS. 8C and 8D, the exposed core portion 1a is crushed between the semicircular convex portion 17a on the top end of the upper electrode 17 and the U-shaped inner surface of the wire connection portion 13a so that the exposed core portion 1a and the wire connection portion 13a are welded by resistance heating to form the connection portion 10B, as shown in FIG. 8E.

According to this method, since the wire connection portion 13a is formed into a U-shape, cores can be prevented from being frayed to some extent by the applied pressure. However, not only it is impossible to sufficiently prevent the fraying, but also the exposed core portion is crushed and deformed, so that the sectional area of the connection portion is reduced. Accordingly, there has been a problem in that it is difficult to obtain a high tensile strength.

In addition, it is necessary to supply a large welding energy because copper, which is a main material of terminals and wires, is low in specific resistance and high in thermal conductivity. Particularly in the conventional example shown in FIGS. 7A and 7B, the top end surface of the lower electrode 15 has a concave shape corresponding to the curve of the wire connection portion 13a so that the contact area of the electrode 15 and the wire connection portion 13a is large. Therefore, the flowing path of a current is relatively wide and the resistance is low, thereby making the heating efficiency low. Accordingly, there has been a problem that the connectivity between a terminal and a wire or between cores is low.

SUMMARY OF THE INVENTION

Taking the forgoing situation into consideration, an object of the present invention is to provide a method of connecting a terminal and a wire using connecting electrodes by which the terminal and the wire can be connected with high strength. Correspondingly, another object of the invention is to provide an electrode apparatus for accomplishing this method.

According to a first aspect of the invention, a method of connecting a terminal, having a U-shaped wire connecting portion, and a wire by spot welding, comprises the following steps: forming a concave groove corresponding to a section of the wire in one of a pair of electrodes; overlaying the wire onto an inner surface of the U-shaped wire connecting portion; positioning the terminal such that the terminal is disposed between the pair of electrodes with the wire being received in the concave groove of the one electrode; and supplying a current to the electrodes.

The method further comprises the step of forming another one of the pair of electrodes into a tapered configuration with a distal end of the electrode being narrower than an opposite end thereof, the distal end having a flat surface on which the wire connecting portion abuts. Further, the flat surface is sufficiently large to hold the wire connecting portion.

According to another aspect of the invention, there is provided an apparatus for spot welding a wire to a terminal having a U-shaped wire connecting portion, comprising: a pair of connecting electrodes, one of the electrodes having an end portion defining a concave cavity and the other of the electrodes having a support surface, wherein during a spot welding operation, the wire connecting portion of the terminal is positioned on the support surface of the other electrode and the end portion of the one electrode abuts against the wire such that the wire is received in the concave cavity. The other electrode is tapered toward the support surface such that the support surface is narrower than an opposite base portion of the other electrode.

BRIEF DESCRIPTION OF THE DRAWINGS

FIGS. 3A to 3E are front views illustrating various steps of operation in the case where the method of the embodiment of the present invention is carried out;

FIGS. 4A and 4B are front views illustrating the way of current flows in the embodiment of the present invention and in a conventional example respectively, for the purpose of comparison therebetween;

FIGS. 5A and 5B are views illustrating a section of a connection portion in the embodiment of the present invention and that in a conventional example, respectively, for the purpose of comparison;

FIGS. 8A to 8E are front views illustrating various steps of operation in the case where the conventional method shown in FIG. 7 is carried out.

DETAILED DESCRIPTION OF THE INVENTION

An embodiment of the present invention will be described below with reference to the drawings.

Figure 2B:
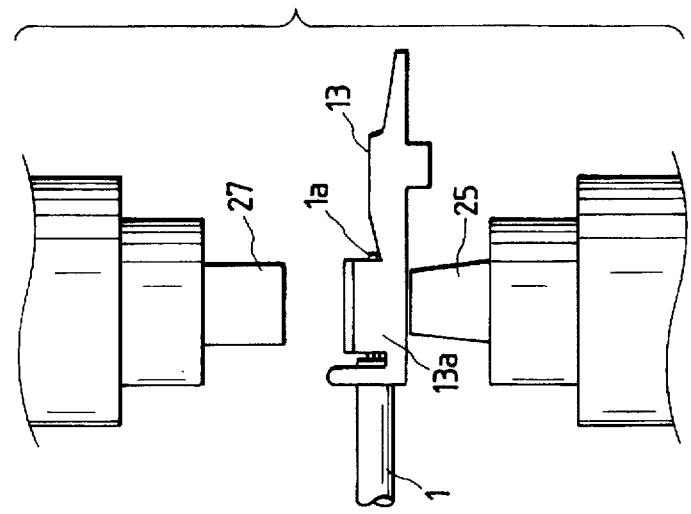
FIGS. 2A and 2B are front and side views, respectively, illustrating the state where the method of the embodiment of the present invention is to be carried out.
Figure 2A:
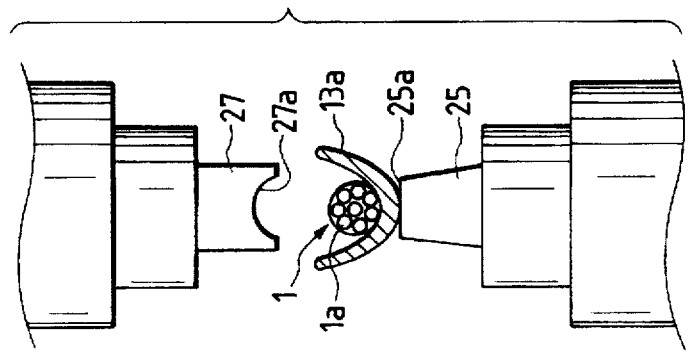
Figure 1:
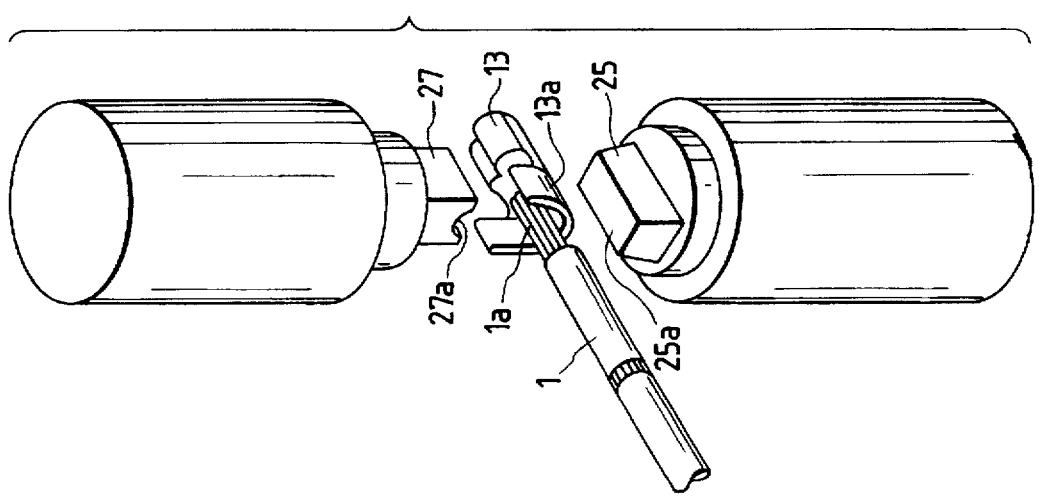
FIG. 1 is a perspective view illustrating a state where a method of an embodiment of the present invention is to be carried out.
Figure 6A:
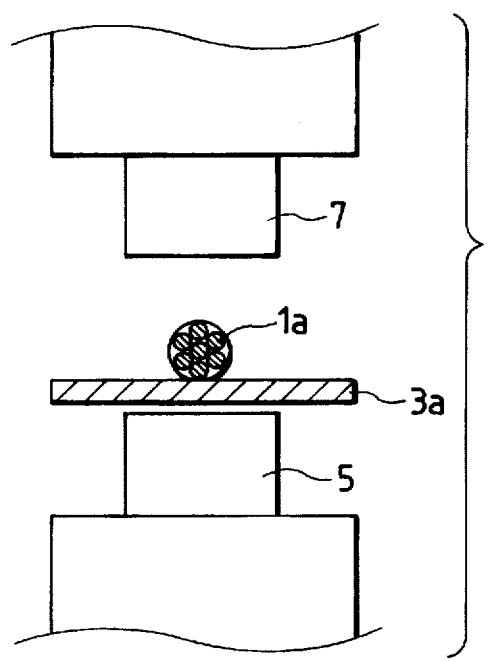
FIGS. 6A and 6B are a front view illustrating a state where a conventional connection method is to be carried out, a sectional view of a connection portion obtained by the same connection method, respectively.

FIG. 1 is a perspective view illustrating the state where the connection method of the embodiment is carried out. FIGS. 2A and 2B are front and side views of the same.

To carry out this connection method, there are used an upper electrode (wire-side electrode) 27 and a lower electrode (terminal-side electrode) 25 for spot welding, the top end surfaces of which are worked specially in advance. In addition, a terminal 13 having a wire connection portion 13a curved into a U-shape is used as a terminal. The lower electrode 25, which will be on the side of the terminal 13, is formed into a tapered shape. The top end of the lower electrode has a flat surface 25a minimum enough to hold the wire connection portion 13a of the terminal 13. In addition, the upper electrode 27, which will be on the side of a wire 1, is formed so that a concave groove 27a corresponding to the section of an exposed core portion 1a of the wire 1 is formed in the top end surface.

In the case where connection is executed, first, as shown in FIG. 3A, the wire connection portion 13a of the terminal 13 is positioned on the flat surface 25a of the lower electrode 25 with the inner surface of the wire connection portion 13a facing upwardly, and the exposed core portion 1a of the wire 1 is laid on the inner surface of the wire connection portion 13a. Next, as shown in FIG. 3B, the upper electrode 27 is moved down against this overlaid portion so that the concave groove 27a of the upper electrode 27 is tightly contacted with the upper surface of the exposed core portion 13a. In this state, the upper electrode 27 is further moved down while a current is flows between the electrodes 25 and 27 in under pressure.

Then, as shown in FIGS. 3C and 3D, the exposed core portion 1a is welded with the wire connection portion 13a in a condition that the exposed core portion 1a is enclosed by the U-shaped wire connection portion 13a and the concave groove 27a of the upper electrode 27 so as to keep substantially its original shape without being crushed or frayed into pieces. As a result, a connection portion 20 with the exposed core portion 1a (melted and solidified herein) having an approximately circular section is obtained as shown in FIG. 3E. In this case, since the lower electrode 25 contacts with the wire connection portion 13a through its flat surface 25a having a minimum surface area, the flowing path of a current is made narrow, and the resistance of this current flowing path is increased, so that the heating efficiency is increased.

Figure 7A:
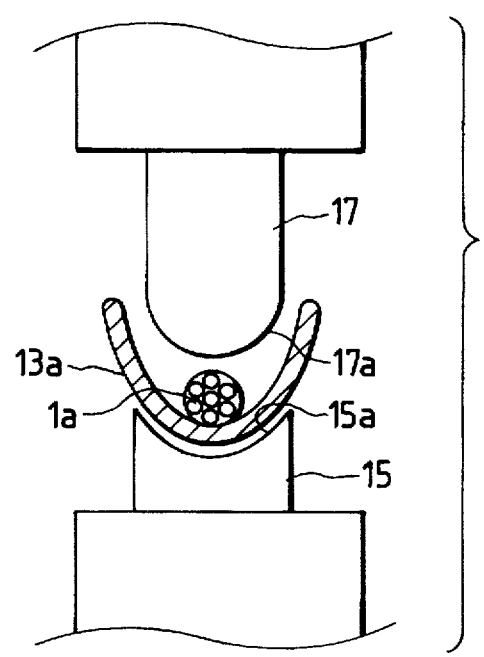
FIGS. 7A and 7B are a front view illustrating a state where another conventional connection method is to be carried out, and a sectional view of a connection portion obtained by the same connection method, respectively.
Figure 6B:
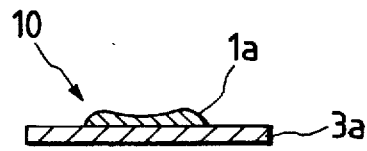
Figure 7B:
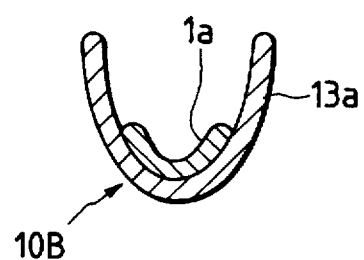

This point will be described briefly in comparison with the conventional example shown in FIGS. 7A and 7B.

FIGS. 4A and 4B show the difference in the way current flows between the conventional example of FIG. 4A and this embodiment of FIG. 4B. In the drawing, the arrows show a current flowing between the electrodes. In the conventional example, the contact area of the wire connection portion 13a and the lower electrode 15 is so large that the flowing path of a current becomes wide. Therefore, resistance R in this current flowing path is small. On the other hand, in this embodiment, the contact area of the wire connection portion 13a and the lower electrode 25 is so small that the flowing path of a current becomes narrow. Therefore, resistance R in this current flowing path is large.

The quantity of heating is determined by the following expression in the case of spot welding.

$Q=I^2Rt$; where:

I: welding current (amps)

R: resistance (ohm)

t: welding time (second)

Q: quantity of heating (joule)]

Because the resistance R is larger in this embodiment than in the conventional example as described above, the quantity of heating Q is larger in this embodiment in the case where the same welding current I and the same welding time t are established, so that the heating efficiency is higher in this embodiment.

FIGS. 5A and 5B show the sections of the connection portions in the conventional example and this embodiment respectively. These drawings schematically show the state of the sections observed by means of a microscope. According to the eye observation and comparison of the sections observed by means of the microscope, an obvious shade portion Ka could be seen in a boundary surface K between the exposed core portion 1a and the wire connection portion 13a in the case of the conventional example (FIG. 5A) in which the heating efficiency was low while no shade portion Ka could be seen in the case of this embodiment in which the heating efficiency was high. Accordingly, it was found that the existence of the boundary surface K between the exposed core portion 1a and the wire connection portion 13a was reduced in this embodiment so that the connectivity of the two was improved.

With the mechanical strength of the connection portions in the conventional example and this embodiment being measured under the same conditions, the following result was obtained.

|  | Tensile Strength | Peel Strength |
| --- | --- | --- |
| Comparison example | 8.5 kgf | 7.0 kgf |
| Invention | 9.0 kgf | 8.2 kgf |

In these examples, it was confirmed that the mechanical strength was increased more in this embodiment than in the comparison example.

As has been described above, according to the invention, a wire is enclosed by a U-shaped wire connection portion of a terminal and a concave groove of a wire-side electrode at the time of spot welding. Accordingly, the change of the shape of the wire in the connection portion can be reduced, and the deformation of the wire or the fraying of cores can be reduced. It is therefore possible to obtain tensile strength almost equivalent to the strength of the wire in the welded portion stably.

According to another aspect of the invention, the heating efficiency in the welded portion is improved, so that good welding can be performed with low energy, and the connectivity between the terminal and the wire or between the cores can be improved. Accordingly, it is possible to improve the peel strength of the wire or the electric characteristics of the connection portion.

We claim:

1. A method of connecting a terminal, having a U-shaped wire connecting portion, and a wire by spot welding, comprising the following steps:

forming a concave groove corresponding to a section of said wire in one of a pair of electrodes;

overlaying said wire onto an inner surface of said U-shaped wire connecting portion;

positioning said terminal such that said terminal is disposed between said pair of electrodes with said wire being received in said concave groove of said one electrode;

supplying a current to said electrodes; and forming another one of said pair of electrodes into a tapered configuration with a distal end of said electrode being narrower than an opposite end thereof, said distal end having a flat surface on which said wire connecting portion abuts.

2. A method of connecting a terminal and a wire according to claim 1, wherein said flat surface is sufficiently large to hold said wire connecting portion.

3. A method of connecting a terminal and a wire according to claim 1, wherein said steps are performed in the stated order.

4. An apparatus for spot welding a wire to a terminal having a U-shaped wire connecting portion, comprising:

a pair of connecting electrodes, one of said electrodes having an end portion defining a concave cavity and the other of said electrodes having a planar support surface, wherein during a spot welding operation, said wire connecting portion of said terminal is positioned on said support surface of said other electrode and said end portion of said one electrode abuts against said wire such that said wire is received in said concave cavity, wherein said other electrode is tapered toward said support surface such that said support surface is narrower than an opposite base portion of said other electrode.

* * * * *